US012519199B2

(12) United States Patent
Ishikawa et al.

(10) Patent No.: US 12,519,199 B2
(45) Date of Patent: Jan. 6, 2026

(54) DIELECTRIC WAVEGUIDE

(71) Applicant: Proterial, Ltd., Tokyo (JP)

(72) Inventors: Hiroshi Ishikawa, Tokyo (JP); Takahiro Sugiyama, Tokyo (JP); Izumi Fukasaku, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 166 days.

(21) Appl. No.: 18/134,960

(22) Filed: Apr. 14, 2023

(65) Prior Publication Data

US 2023/0378626 A1 Nov. 23, 2023

(30) Foreign Application Priority Data

May 18, 2022 (JP) ................................ 2022-081323

(51) Int. Cl.
*H01P 3/16* (2006.01)

(52) U.S. Cl.
CPC ..................................... *H01P 3/16* (2013.01)

(58) Field of Classification Search
CPC ........................................................ H01P 3/16
USPC ......................................................... 333/239
See application file for complete search history.

(56) References Cited

U.S. PATENT DOCUMENTS 10,826,149 B2 * 11/2020 Rusch ...................... H01P 3/16
10,944,146 B2 3/2021 Yoshimoto et al.
2018/0136456 A1 5/2018 Watanabe et al.
2020/0036074 A1 1/2020 Yoshimoto et al.
2021/0175927 A1 * 6/2021 Bennett .................... H04B 3/46

FOREIGN PATENT DOCUMENTS

| | | | |
|---|---|---|---|
| JP | 2008-028523 | A | 2/2008 |
| JP | 6355094 | B2 | 7/2018 |
| WO | 2017002585 | A1 | 1/2017 |
| WO | 2019069712 | A1 | 4/2019 |

OTHER PUBLICATIONS

K. Okamoto, "Theory of Optical Waveguides (Photonies Series 13)". Corona Publishing Corporation, pp. 66-69, Aug. 1992 and partial English translation thereof.
Office Action, dated Apr. 8, 2025 in Japanese Application No. 2022-081323 and English Translation Thereof.
Japanese Office Action, dated Aug. 5, 2025 in Japanese Application No. 2022-081323 and the English Translation.

* cited by examiner

*Primary Examiner* — Andrea Lindgren Baltzell
*Assistant Examiner* — Abigail Amir Yaldo
(74) *Attorney, Agent, or Firm* — MCGINN I.P. LAW GROUP, PLLC

(57) ABSTRACT

The dielectric waveguide 1 transmits an electromagnetic wave with a frequency of 20 GHz or more and 200 GHz or less and includes a core 2 including a plurality of dielectric waveguide lines 21 that are bundled together and are composed of a dielectric made of a resin or quartz.

6 Claims, 7 Drawing Sheets

DIELECTRIC WAVEGUIDE

CROSS-REFERENCE TO RELATED APPLICATIONS

The present application is based on Japanese patent application No. 2022-081323 filed on May 18, 2022, the entire contents of which are incorporated herein by reference.

TECHNICAL FIELD

The present invention relates to a dielectric waveguide that transmits electromagnetic waves in a quasi-millimeter wave band and a millimeter wave band.

BACKGROUND OF THE INVENTION

Conventionally, dielectric waveguides using a core made of a dielectric and transmitting electromagnetic waves are known. For example, Patent Literature 1 discloses a dielectric waveguide that transmits microwave or millimeter-wave electrical signals.

CITATION LIST

Patent Literature 1: Japanese Patent No. 6355094

Non-Patent Literature 1: Katsunari Okamoto, "Fundamentals of Optical Waveguides", Corona Publishing Co., Ltd., published on Oct. 1, 1992

SUMMARY OF THE INVENTION

Dielectric waveguides are required to have low bending loss so that transmission loss does not become too high when bent and routed. In order to reduce the bending loss, the normalized frequency (standardized frequency) V needs to be increased to concentrate the electromagnetic wave distribution inside the core, and the core diameter of dielectric waveguides needs be increased accordingly. However, dielectric waveguides with a large-diameter core are difficult to bend, making the routing work difficult.

In more particular, the normalized frequency V is desirably at least 1.0 (more preferably 1.7 or more) to reduce the bending loss. In order to have the normalized frequency V of, e.g., 1.7 when having a structure in which a clad (i.e., sheath, outer covering) made of PTFE (polytetrafluoroethylene) is provided to cover a core and assuming that a specific refractive index difference between the core and the clad is substantially the same as that of a standard optical fiber (about 0.3%), the core diameter of dielectric waveguides needs be 4.2 cm or more at a frequency of 20 GHz which is in a quasi-millimeter wave band. Under the same conditions as those described above but at a frequency of, e.g., 200 GHz which is in a millimeter wave band, the core diameter of the dielectric waveguides needs to be 4.2 mm or more. Dielectric waveguides with such a thick core are difficult to bend.

Therefore, it is an object of the invention to provide a dielectric waveguide that can suppress transmission loss when transmitting electromagnetic waves in a quasi-millimeter wave band or a millimeter wave band and is also excellent in bendability.

To solve the problem described above, the invention provides a dielectric waveguide that transmits an electromagnetic wave with a frequency of 20 GHz or more and 200 GHz or less, the dielectric waveguide comprising:

a core comprising a plurality of dielectric waveguide lines that are bundled together and comprise a dielectric comprising a resin or quartz.

Advantageous Effects of the Invention

According to the invention, it is possible to provide a dielectric waveguide that can suppress transmission loss when transmitting electromagnetic waves in a quasi-millimeter wave band or a millimeter wave band and is also excellent in bendability.

DETAILED DESCRIPTION OF THE INVENTION

Embodiment

An embodiment of the invention will be described below in conjunction with the appended drawings.

Problems when Using a Single Core

Prior to describing the embodiment of the invention, the problems with conventionally-used dielectric waveguides having a single cylindrical core (hereinafter, referred to as the conventional dielectric waveguides) will be described first. To reduce bending loss in the conventional dielectric waveguides, power (so-called electric power) of electromagnetic waves propagating through the dielectric waveguides needs to be concentrated inside the core. As shown in Non-Patent Literature 1 mentioned above and in FIG. 1, a proportion of electric power of an electromagnetic wave propagating inside the core with respect to total electric power (so-called total power) of electromagnetic waves propagating through the dielectric waveguide (so-called electric power ratio) increases as the normalized frequency V (so-called the V-value) increases. In the graph in FIG. 1, the larger the electric power ratio, the larger the electric power of the electromagnetic wave propagating inside the core, and all the electromagnetic waves propagate inside the core when, e.g., the electric power ratio is 1.0.

Here, the normalized frequency V is defined by the following equation (1), where f is the frequency of the electromagnetic wave transmitted, b is the core radius, $\varepsilon 1$ is the relative permittivity of the core, $\varepsilon 2$ is the relative permittivity of the cladding (clad) made of a dielectric and provided around the core, and c is the speed of light in vacuum.

$$V=2\pi\times b\times f\times(\varepsilon 1-\varepsilon 2)^{1/2}/c \quad (1)$$

Figure 1:
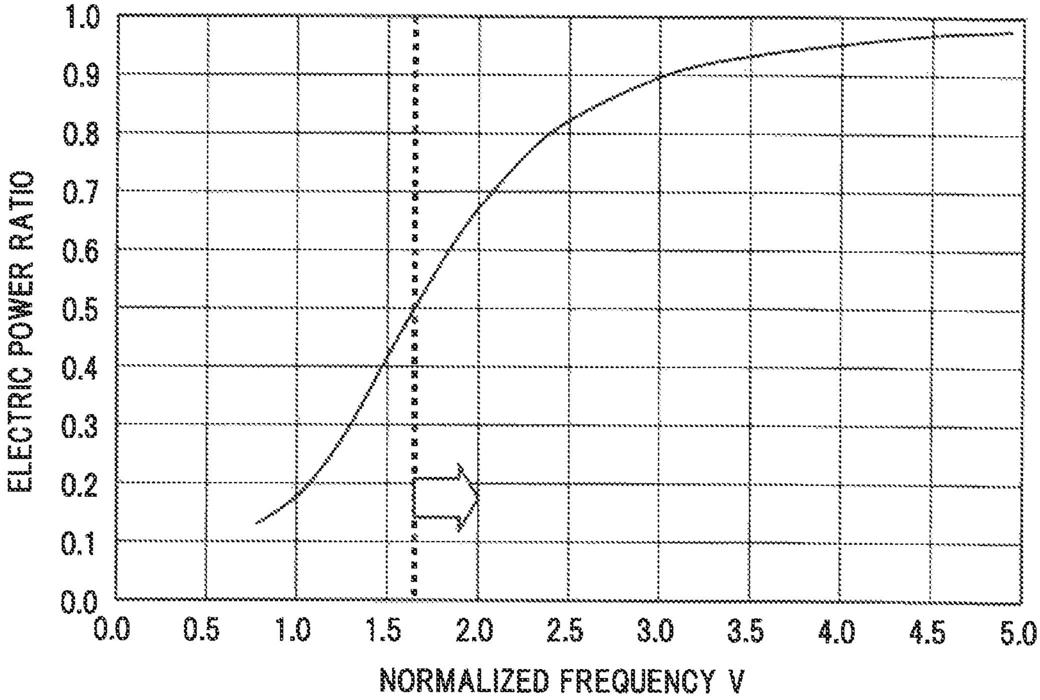
FIG. 1 is a graph showing a proportion of electric power of an electromagnetic wave propagating inside a core with respect to the total electric power of electromagnetic waves propagating in a conventional dielectric waveguide.

As shown in FIG. 1, in the $HE_{11}$ mode which is the fundamental mode of cylindrical dielectric waveguide, the normalized frequency V needs to be 1.7 or more so that the power of the electromagnetic wave propagating inside the core is not less than half the total power.

The magnitude of bending loss varies also depending on the bending radius, but for practical dielectric waveguides, the normalized frequency V is desirably at least 1.0 to sufficiently reduce the bending loss when routed. Therefore, from the viewpoint of reducing the bending loss, the V-value of dielectric waveguide is desirably at least 1.0 (more preferably 1.7 or more). To satisfy such a condition when assuming that the frequency of the electromagnetic wave propagating inside the core and the relative permittivity of the dielectric waveguide are constant, the core diameter of the dielectric waveguide (the diameter=2×the core radius b) needs to be greater than a value determined by the following equation (2).

$$b=V\times c/(2\pi\times f\times(\varepsilon 1-\varepsilon 2)^{1/2}) \quad (2)$$

(where V≥1.0)

On the other hand, the normalized frequency V of the dielectric waveguide is desirably set to a suitable condition according to signal transmission applications.

Single-Mode Transmission and its Suitable Conditions

In signal transmission applications, dielectric waveguides are sometimes used under single-mode transmission conditions, i.e., conditions where the electromagnetic wave has a single eigenmode (except for polarization degree of freedom), in order to suppress signal waveform degradation. To satisfy the single-mode transmission conditions, the normalized frequency V is desirably 2.4 or less. Therefore, to achieve low-bending loss transmission in dielectric waveguides under the single-mode transmission conditions, the normalized frequency V is desirably 1.0 or more and 2.4 or less (more preferably, 1.7 or more and 2.4 or less).

In single-mode transmission, the larger the normalized frequency V, the lower the bending loss. Thus, as a suitable condition for single-mode transmission, the normalized frequency V is preferably about 2.3 to 2.4. In addition, the bending loss of dielectric waveguides is greater in higher-order modes than in fundamental modes which satisfy the single-mode transmission conditions. Therefore, taking into consideration the attenuation of higher-order modes due to the bending loss, the normalized frequency V is preferably about 2.4 to 2.5 so as to satisfy the single-mode transmission conditions in a simulated manner.

Multimode Transmission and its Suitable Conditions

In applications where some signal waveform degradation can be tolerated, or in applications where electric power is transmitted, dielectric waveguides are also used under multimode transmission conditions to facilitate coupling of electromagnetic waves from the outside. In multimode transmission, any number of eigenmodes may exist and there is thus no upper limit to the normalized frequency V. That is, in multimode transmission, there is no upper limit to the diameter of the dielectric waveguide.

As described above, in order to reduce the bending loss in conventionally-used dielectric waveguides having a single cylindrical core, the diameter of the dielectric waveguide needs to be a size with which the normalized frequency V≥1.0 (preferably the normalized frequency V≥1.7) is satisfied. Particularly, in single-mode transmission, the diameter of the dielectric waveguide is preferably a size with which the normalized frequency V=2.3 to 2.4 is satisfied.

The case where the normalized frequency V is 2.4 and the frequency f of the electromagnetic wave transmitted is 28 GHz, which is in a quasi-millimeter wave band, will be examined as an example. In case of, e.g., a dielectric waveguide which has a core made of PTFE (polytetrafluoroethylene) with a relative permittivity of 2.1 and is absent of a clad (the core is surrounded by air), the diameter of the single core is 7.8 mm from the above equation (2), hence, the core diameter is large. In case of, e.g., a dielectric waveguide which has a core made of PTFE (polytetrafluoroethylene) with a relative permittivity of 2.2 and a clad made of PTFE (polytetrafluoroethylene) with a relative permittivity of 2.1 and is configured to protect the core by the clad, the diameter of the single core is 26 mm from the above equation (2), hence, the core diameter is very large. Moreover, when the normalized frequency V is set to a value that satisfies the multimode transmission conditions to reduce the bending loss of the dielectric waveguide, the diameter of the single core becomes even larger.

In case of, e.g., a dielectric waveguide which has a core made of quartz with a relative permittivity of 3.8 and is absent of a clad (the core is surrounded by air), the diameter of the single core is 4.9 mm from the above equation (2), hence, the core diameter is large. In case that, e.g., both the core and the clad are made of quartz and the core is protected by the clad, and when assuming that the relative refractive index difference between the core and the clad is 0.3% which is the same as in a standard single-mode optical fiber, the diameter of the single core is 54 mm, hence, the core diameter is very large.

The dielectric waveguides having a thick single cylindrical dielectric core made of PTFE or quartz as described above are difficult to bend and may be broken if trying to forcibly bend at ordinary temperature. Therefore, at the time of bending and routing such dielectric waveguides, it is necessary to perform bending, etc., in a state in which the dielectric waveguides are softened by heating at high temperature, hence, routing work is difficult. In consideration of these circumstances, the present inventors have made intensive studies on a dielectric waveguide that is easy to bend and easy to route while suppressing transmission losses, and as a result, the present invention was made.

Dielectric Waveguide 1

Figure 2:
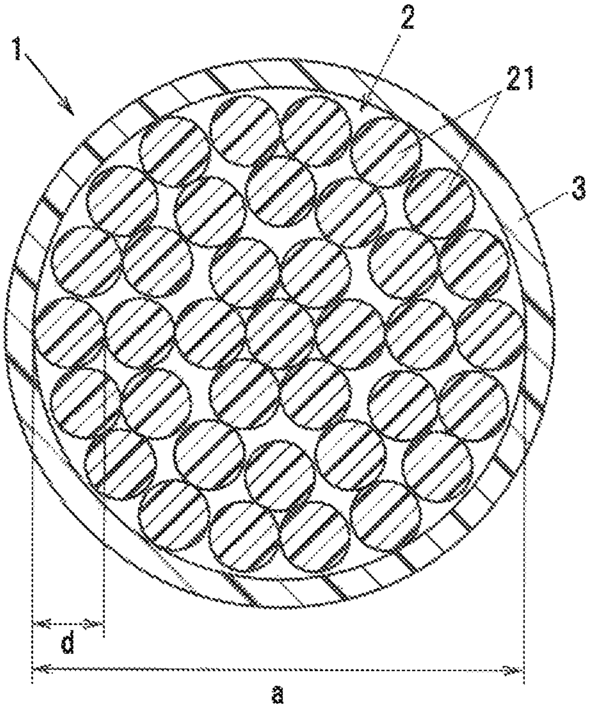
FIG. 2 is a cross-sectional view showing a dielectric waveguide in an embodiment of the present invention when taken perpendicular to a longitudinal direction thereof.

FIG. 2 is a cross-sectional view showing a dielectric waveguide 1 in the present embodiment when taken perpendicular to a longitudinal direction thereof. As shown in FIG. 2, the dielectric waveguide 1 has a core 2 including plural dielectric waveguide lines 21 that are bundled together and composed of a dielectric made of a resin or quartz, and a clad 3 that covers the core 2. The dielectric waveguide 1 is used to transmit electromagnetic waves with a frequency of 20 GHz or more and 200 GHz or less (electromagnetic waves in a quasi-millimeter wave band or a millimeter wave band).

In the dielectric waveguide 1, the core 2 is composed of plural thin dielectric waveguide lines 21 (having a diameter of, e.g., 3.5 mm or less), which allows the dielectric waveguide 1 to be easily bend while increasing the diameter of the core 2. As a result, it is possible to realize the dielectric waveguide 1 that is easy to bend and easy to route while reducing transmission losses. Manufacturing of thick dielectric waveguide lines 21 is technically difficult and requires specialized equipment. On the other hand, thin dielectric waveguide lines 21 can be manufactured relatively easily, and also, existing optical fiber or electric wire manufacturing equipment can be used as is for the manufacturing thereof. Thus, use of thin dielectric waveguide lines 21 reduces equipment cost and manufacturing cost, and thereby contributes to cost reduction of the dielectric waveguide 1.

The core 2 is desirably composed of a concentric strand obtained by concentrically stranding plural dielectric waveguide lines 21, a bunch strand obtained by bunching and stranding plural dielectric waveguide lines 21, or a composite stranded wire obtained by stranding plural child strands composed of a twisted pair wire, a concentric strand, or a bunch strand, etc., composed of plural dielectric waveguide lines 21. It is thereby possible to suppress deformation of the core 2 due to external force, etc., and maintain the circular cross-sectional shape of the entire core 2, thereby suppressing a transmission loss due to deformation of the cross-sectional shape. In this regard, to make it easier to maintain the circular cross-sectional shape of the core 2, it is more desirable that the core 2 be formed by concentrically stranding plural dielectric waveguide lines 21. When the core 2 is composed of a bunch strand obtained by bunching and stranding plural dielectric waveguide lines 21 or a composite stranded wire using such bunch strands, it is possible to further improve bendability of the dielectric waveguide 1 while increasing the diameter of the core 2.

A diameter a of the core 2 is preferably determined so that the bending loss is small at the frequency of the electromagnetic wave transmitted. In more particular, the diameter a of the core 2 is desirably in the range where the normalized frequency V is 1.0 or more (preferably 1.7 or more). For example, the diameter a of the core 2 is 23 mm or less. The normalized frequency V of the dielectric waveguide 1 can be calculated by the following equation (3), where f is the frequency of the electromagnetic wave, $b_{eq}$ is the radius of the core 2, and $\varepsilon_{eq}$ is the spatial average of the relative permittivity inside the entire core 2.

$$V=2\pi\times b_{eq}\times f\times(\varepsilon_{eq}-\varepsilon 2)^{1/2}/c \quad (3)$$

Therefore, the diameter a of the core 2 (the diameter a=2×the core radius $b_{eq}$) is determined by the following equation (4), according to the required normalized frequency V.

$$b_{eq}=V\times c/(2\pi\times f\times(\varepsilon_{eq}-\varepsilon 2)^{1/2}) \quad (4)$$

(where V≥1.0)

Particularly in single-mode transmission applications, the core 2 preferably satisfies the single-mode transmission conditions at the frequency of the electromagnetic wave transmitted. In more particular, the normalized frequency V is preferably 2.5 or less. Therefore, in single-mode transmission applications, the normalized frequency V in the above equation (4) is preferably set in the range of $1\leq V\leq 2.5$.

In this regard, to reduce the bending loss as much as possible in single mode transmission applications, the normalized frequency V is preferably as high as possible within the range where the core 2 satisfies the single mode transmission conditions. Therefore, to reduce the bending loss as much as possible in single mode transmission applications, the normalized frequency V in the above equation (4) is preferably set in the range of $2.3<V<2.5$.

Meanwhile, in multimode transmission applications, there is no upper limit to the normalized frequency V. Therefore, in multimode transmission applications, the normalized frequency V only needs to be at least 1.0, preferably 1.7 or more, and the diameter a of the core 2 can be increased as desired.

The diameter d of the dielectric waveguide line 21 used in the core 2 is desirably small enough to be easily bent and easily manufactured (e.g., 3.5 mm or less in diameter, more preferably 2.0 mm or less in diameter, and further preferably 1.5 mm or less), since it is difficult to bend and also difficult to manufacture when the diameter d is too large. Although the cross-sectional shape of the dielectric waveguide line 21 is a circular shape in the present embodiment, it is not limited thereto. The cross-sectional shape of the dielectric waveguide line 21 may be other shapes such as an elliptical shape.

Figure 3A:
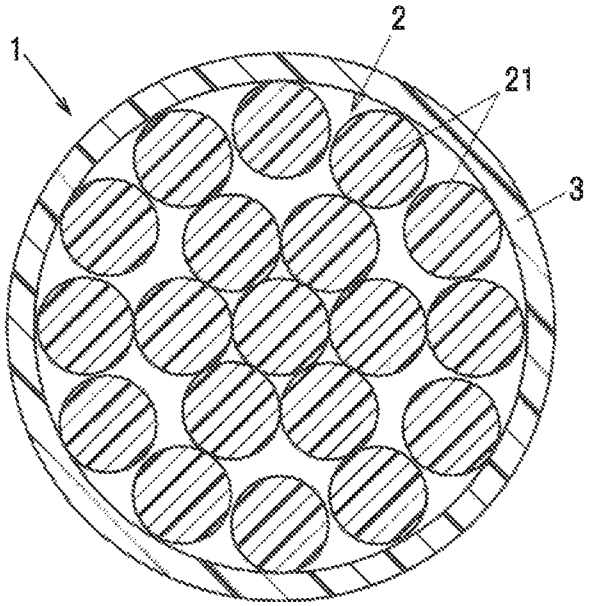
FIGS. 3A and 3B are cross-sectional views showing dielectric waveguides in modified examples of the invention when taken perpendicular to the longitudinal direction thereof.
Figure 3B:
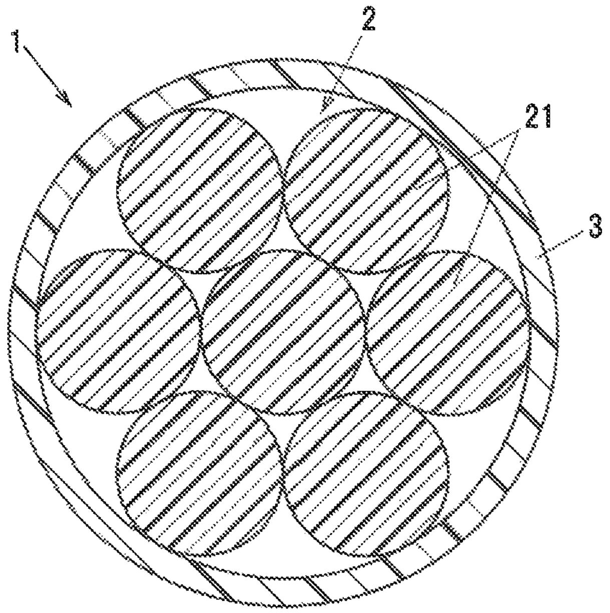

The number of the dielectric waveguide lines 21 used in the core 2 is determined according to the diameter d of the dielectric waveguide line 21 and the required normalized frequency V (the required diameter a of the core 2). In the present embodiment, the core 2 having the diameter a of 9.8 mm is formed by concentrically stranding thirty-seven dielectric waveguide lines 21 having the diameter d of 1.4 mm. The number of the dielectric waveguide lines 21 used in the core 2 is not specifically limited. In this regard, however, the core 2 is preferably configured as a concentric strand as mentioned above, and the number of the dielectric waveguide lines 21 used in the core 2 may be, e.g., nineteen as shown in FIG. 3A or seven as shown in FIG. 3B.

Figure 4:
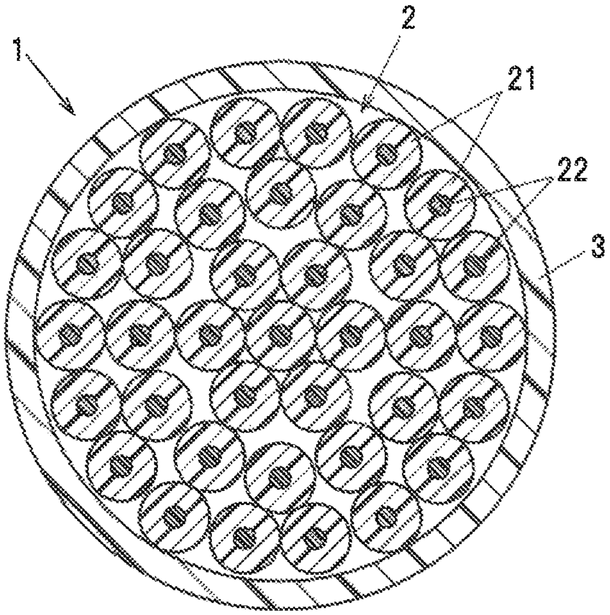
FIG. 4 is a cross-sectional view showing a dielectric waveguide in a modified example of the invention when taken perpendicular to the longitudinal direction thereof.

The dielectric waveguide line 21 is composed of a dielectric made of a resin or quartz. As the resin used for the dielectric waveguide line 21, it is possible to use any one of fluoropolymer, foamed fluoropolymer, polyethylene, foamed polyethylene, polypropylene, and foamed polypropylene. The dielectric waveguide line 21 made of FEP (tetrafluoroethylene-hexafluoropropylene copolymer), which is a fluoropolymer, is used in the present embodiment. To equalize the diameters of the dielectric waveguide lines 21, the dielectric waveguide line 21 may alternatively have a structure with a tensile-strength fiber 22 such as aramid fiber in a center thereof and a dielectric made of a resin or quartz and provided around the tensile-strength fiber 22, as shown in FIG. 4.

In manufacturing of the dielectric waveguide line 21, it is possible to use a manufacturing method in which a large-diameter base material is melted by heat and drawn into a small-diameter dielectric waveguide line 21. It is also possible to manufacture a small-diameter dielectric waveguide line 21 by placing the resin listed above in an extruder and extruding the resin melted by heat inside the extruder into a small diameter line.

The clad 3 serves to protect the core 2 and holds the dielectric waveguide lines 21 constituting the core 2 so as not to unravel (so that the cross-sectional shape is not deformed). In the present embodiment, the clad 3 is composed of a tape member made of fluoropolymer (PTFE) that is spirally wound around the core 2. However, it is not limited thereto, and the clad 3 may be formed by extruding a resin made of fluoropolymer through the extrusion molding process such as tube extrusion process. The clad 3 may not be provided depending on signal transmission application.

Transmission Loss Evaluation

Figure 5A:
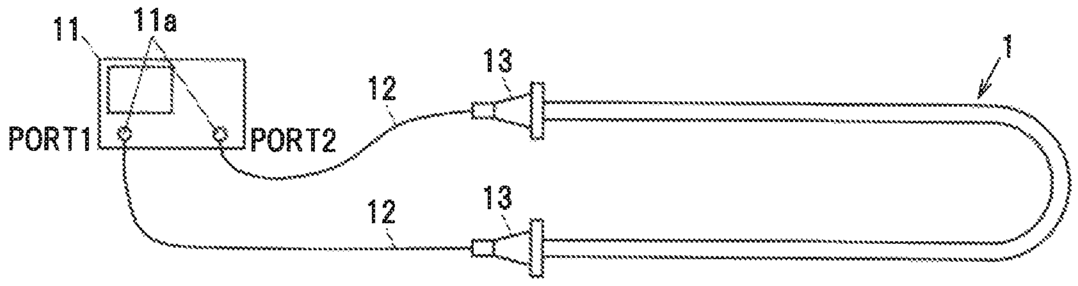
FIGS. 5A and 5B are explanatory diagrams illustrating a transmission loss evaluation test.
Figure 5B:
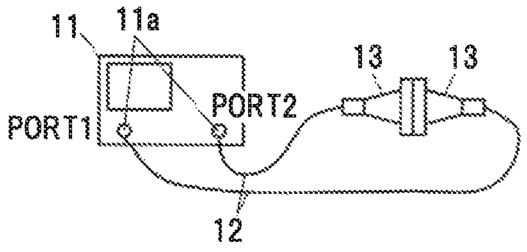
Figure 6:
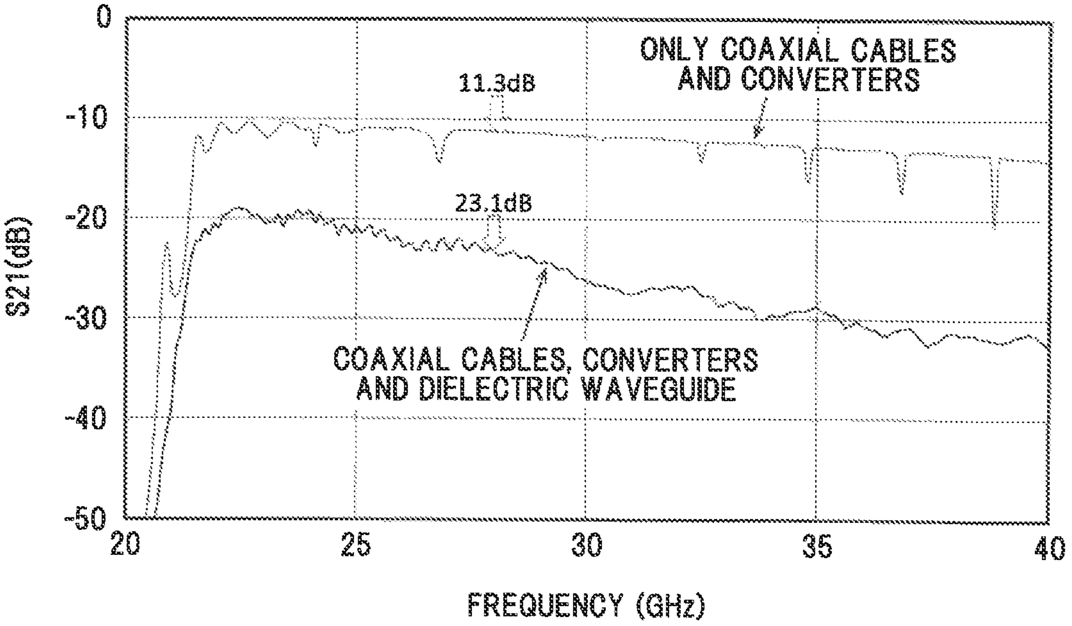
FIG. 6 is a graph showing measurement results of transmission loss.

The transmission loss in the dielectric waveguide 1 shown in FIG. 2 was evaluated using a network analyzer 11 as shown in FIG. 5A. The dielectric waveguide 1 used here had the core 2 formed by concentrically stranding thirty-seven 1.4 mm-diameter dielectric waveguide lines 21 made of FEP and the clad 3 formed by spirally winding a PTFE tape member around the core 2. Ends of coaxial wires 12 respectively extending out of two ports 11*a* (PORT1 and PORT2) of the network analyzer 11 were connected to both ends of the dielectric waveguide 1 through converters 13 for conversion between electrical signals into electromagnetic waves. The length of the dielectric waveguide 1 was 10.8 m, and the signal frequency was 20 to 40 GHz. The normalized frequency V of the core 2 here is 1.7 at 22 GHz, 2.2 at 28 GHz, and 3.1 at 40 GHz. The measurement result of S21 obtained by the network analyzer 11 is shown in FIG. 6. In addition, to investigate the influence of the coaxial wires 12 and the converters 13, the converters 13 were directly connected to each other as shown in FIG. 5B and the same measurement was conducted. The result thereof is also shown in FIG. 6.

As shown in FIG. 6, e.g., at a frequency of 28 GHz (=when the frequency of the electromagnetic wave transmitted is 28 GHz), a loss due to the dielectric waveguide 1 is 23.1 −11.3=11.8 dB, and a loss per unit length of the dielectric waveguide 1 is 11.8/10.8=1.1 dB/m. From this result, it is considered that the transmission loss in the dielectric waveguide 1 is sufficiently suppressed.

Next, insertion loss was simulated for Example 1 with the core 2 composed of concentrically stranded nineteen dielectric waveguide lines 21 having a diameter of 2.0 mm (see FIG. 3A), Example 2 with the core 2 composed of concentrically stranded seven dielectric waveguide lines 21 having a diameter of 3.3 mm (see FIG. 3B), and Conventional Example with a single cylindrical core having a diameter of 10 mm. In each case, the structure was such that the clad 3 was not provided around the core 2 (the core 2 was surrounded by air), the relative permittivity of the dielectric constituting the core 2 was 2.1, the dielectric loss tangent was 0.0003, and the core diameter was about 10 mm. In addition, the twist pitch in Examples 1 and 2 was 150 mm, and the frequency of the electromagnetic wave transmitted was 28 GHz. The simulation results are summarized in FIG. 7.

Figure 7:
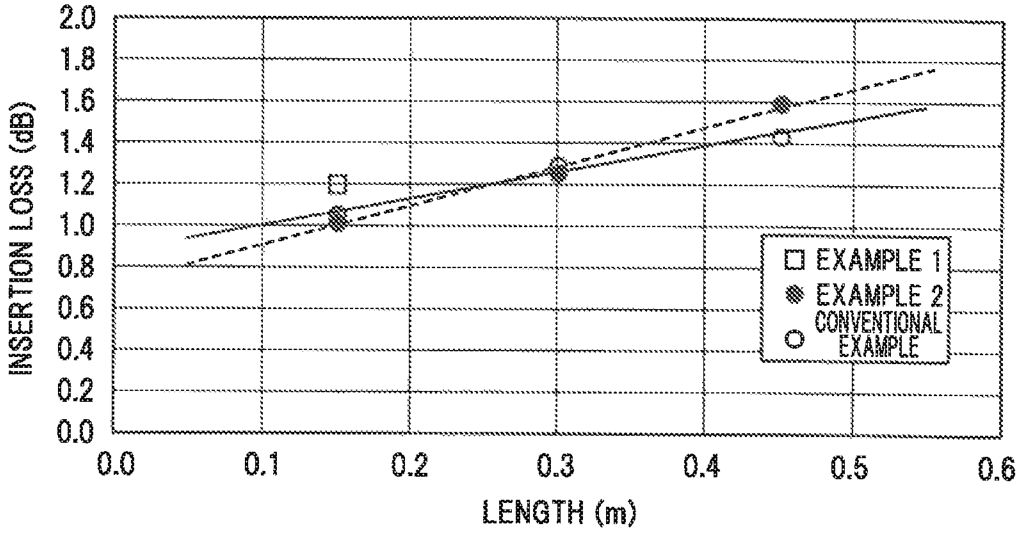
FIG. 7 is a graph showing simulation results of insertion loss.

As shown in FIG. 7, the insertion losses in Examples 1 and 2 are substantially the same as that in Conventional Example, which confirmed that the transmission losses in Examples 1 and 2 of the present invention are substantially the same as that in Conventional Example.

Functions and Effects of the Embodiment

As described above, the dielectric waveguide 1 in the present embodiment has the core 2 including plural dielectric waveguide lines 21 that are bundled together and composed of a dielectric made of a resin or quartz. By forming the core 2 using plural thin dielectric waveguide lines 21, transmission loss when transmitting electromagnetic waves in the quasi-millimeter wave band or the millimeter wave band can be suppressed to the similar level to the conventional product and also the dielectric waveguide 1 can be easily bent. As a result, workability of the routing work can be greatly improved, and the dielectric waveguide 1 with improved handleability can be realized. In addition, forming the core 2 using plural thin dielectric waveguide lines 21 allows existing optical fiber or electric wire manufacturing equipment to be used for manufacturing, hence, it is possible to realize the dielectric waveguide 1 that is easily manufactured at low cost.

SUMMARY OF THE EMBODIMENT

Technical ideas understood from the embodiment will be described below citing the reference signs, etc., used for the embodiment. However, each reference sign, etc., described below is not intended to limit the constituent elements in the claims to the members, etc., specifically described in the embodiment.

According to the first feature, a dielectric waveguide 1 transmits an electromagnetic wave with a frequency of 20 GHz or more and 200 GHz or less, and includes a core 2 including a plurality of dielectric waveguide lines 21 that are bundled together and composed of a dielectric made of a resin or quartz.

According to the second feature, in the dielectric waveguide 1 as described by the first feature, the core 2 includes the plurality of dielectric waveguide lines 21 that are stranded together.

According to the third feature, in the dielectric waveguide 1 as described by the first or second feature, the core 2 has a normalized frequency V of 1.0 or more at a frequency of an electromagnetic wave transmitted.

According to the fourth feature, in the dielectric waveguide 1 as described by any one of the first to third features, the core 2 has a normalized frequency V of 2.5 or less at a frequency of an electromagnetic wave transmitted.

According to the fifth feature, in the dielectric waveguide 1 as described by any one of the first to fourth features, the resin includes any one of fluoropolymer, foamed fluoropolymer, polyethylene, foamed polyethylene, polypropylene, and foamed polypropylene.

According to the sixth feature, in the dielectric waveguide 1 as described by any one of the first to fifth features, each of the plurality of dielectric waveguide lines 21 includes a tensile-strength fiber 22 in a center thereof and the dielectric around the tensile-strength fiber 22.

Although the embodiment of the invention has been described, the invention according to claims is not to be limited to the embodiment described above. Further, please note that not all combinations of the features described in the embodiment are necessary to solve the problem of the invention. In addition, the invention can be appropriately modified and implemented without departing from the gist thereof.

The invention claimed is:

1. A dielectric waveguide that transmits an electromagnetic wave with a frequency of 20 GHz or more and 200 GHz or less, the dielectric waveguide comprising:

a core comprising a plurality of dielectric waveguide lines that are bundled together and comprise a dielectric comprising a resin or quartz, wherein the core has a normalized frequency V of 1.0 or more at a frequency of the electromagnetic wave transmitted, and wherein the normalized frequency V is calculated as $V=2\pi \times b \times f \times (\varepsilon 1-\varepsilon 2)^{1/2}/c$, where f is the frequency of the electromagnetic wave transmitted, b is a core radius, ε1 is a relative permittivity of the core, ε2 is a relative permittivity of a cladding made of a dielectric and provided around the core, and c is a speed of light in vacuum.

2. The dielectric waveguide according to claim 1, wherein the core comprises the plurality of dielectric waveguide lines that are stranded together.

3. The dielectric waveguide according to claim 1, wherein each of the plurality of dielectric waveguide lines comprises a tensile-strength fiber in a center thereof and the dielectric around the tensile-strength fiber.

4. The dielectric waveguide according to claim 1, wherein the normalized frequency V of the core is 2.5 or less at the frequency of a dielectric cladding transmitted.

5. The dielectric waveguide according to claim 1, wherein the resin comprises any one of fluoropolymer, foamed fluoropolymer, polyethylene, foamed polyethylene, polypropylene, and foamed polypropylene.

6. A dielectric waveguide that transmits an electromagnetic wave with a frequency of 20 GHz or more and 200 GHz or less, the dielectric waveguide comprising:

a core comprising a plurality of dielectric waveguide lines that are bundled together and comprise a dielectric comprising a resin or quartz, wherein the core has a normalized frequency V of 2.5 or less at a frequency of the electromagnetic wave transmitted, and wherein the normalized frequency V is calculated as $V=2\pi\times b\times f\times(\varepsilon 1-\varepsilon 2)^{1/2}/c$, where f is the frequency of the electromagnetic wave transmitted, b is a core radius, ε1 is a relative permittivity of the core, ε2 is a relative permittivity of a cladding made of a dielectric and provided around the core, and c is a speed of light in vacuum.

* * * * *